United States Patent
Fausak et al.

(10) Patent No.: US 10,853,488 B2
(45) Date of Patent: Dec. 1, 2020

(54) SYSTEM AND METHOD FOR A SECURITY FILEWALL SYSTEM FOR PROTECTION OF AN INFORMATION HANDLING SYSTEM

(71) Applicant: Dell Products, LP, Round Rock, TX (US)

(72) Inventors: Andrew T. Fausak, Coppell, TX (US); Joseph Kozlowski, Hutto, TX (US); Carlton A. Andrews, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 248 days.

(21) Appl. No.: 15/645,198

(22) Filed: Jul. 10, 2017

(65) Prior Publication Data
US 2019/0012458 A1    Jan. 10, 2019

(51) Int. Cl.
  *G06F 21/56* (2013.01)
  *G06F 21/62* (2013.01)
(52) U.S. Cl.
  CPC ........ *G06F 21/565* (2013.01); *G06F 21/6218* (2013.01); *G06F 2221/034* (2013.01)
(58) Field of Classification Search
  CPC .............................. G06F 21/56; G06F 21/565
  USPC ........................................ 713/150; 726/5–7
  See application file for complete search history.

(56) References Cited

U.S. PATENT DOCUMENTS

| | | | | |
|---|---|---|---|---|
| 8,863,298 B2* | 10/2014 | Akella | ................ | H04L 63/0815 726/26 |
| 8,868,626 B2* | 10/2014 | Iftode | ..................... | G06F 16/11 707/822 |
| 9,100,366 B2* | 8/2015 | Luo | ........................ | G06F 21/552 |
| 9,213,836 B2* | 12/2015 | Mayer | ..................... | G06F 21/56 |
| 9,336,385 B1* | 5/2016 | Spencer | .................. | G06F 21/56 |
| 9,400,889 B2* | 7/2016 | Chess | ................... | G06F 21/563 |
| 9,405,903 B1* | 8/2016 | Xie | ....................... | H04L 63/1425 |
| 9,483,644 B1* | 11/2016 | Paithane | ............... | G06F 16/128 |

(Continued)

OTHER PUBLICATIONS

Microsoft Windows Driver Developer Doc Team, "Load Order Groups for File System Filter Drivers," 1 page, Apr. 20, 2017, https://docs.microsoft.com/en-us/windows-hardware/drivers/ifs/load-order-groups-for-file-system-filter-drivers.

*Primary Examiner* — Lynn D Feild
*Assistant Examiner* — Viral S Lakhia
(74) *Attorney, Agent, or Firm* — Prol Intellectual Property Law PLLC; H. Kenneth Prol

(57) ABSTRACT

A method and system comprising a processor executing code instructions of a security firewall validation system for inspecting primitive file system operations to detect abnormal file types, abnormal file operation, or abnormal intended result files in violation of a security firewall rule set, a memory for storing the security firewall rule set describing permitted access to file types, file-paths, mounting points, data volume access rules, or data operations relating to the primitive file system operations where the security firewall validation system intercepts an attempted primitive file system operation and the security firewall validation system compares the attempted primitive file system operation including associated arguments indicating file, file location, and intended result to the security firewall rule set. The processor logs a detected firewall rule violation event when a firewall rule is violated by the attempted primitive file system operation or its associated arguments defining the primitive file system operation.

20 Claims, 7 Drawing Sheets

(56) References Cited

U.S. PATENT DOCUMENTS

| | | | |
|---|---|---|---|
| 9,514,309 B1* | 12/2016 | Mann | G06F 21/565 |
| 10,185,670 B2* | 1/2019 | Litichever | G06F 9/45504 |
| 2005/0182958 A1* | 8/2005 | Pham | G06F 21/51 |
| | | | 726/22 |
| 2014/0372985 A1* | 12/2014 | Levin | G06F 11/3608 |
| | | | 717/126 |
| 2016/0019132 A1* | 1/2016 | Vilakkumadathil | G06F 16/254 |
| | | | 717/126 |
| 2016/0078225 A1* | 3/2016 | Ray | G06F 21/554 |
| | | | 726/23 |
| 2017/0300690 A1* | 10/2017 | Ladnai | G06F 21/554 |
| 2018/0197089 A1* | 7/2018 | Krasser | G06N 5/04 |
| 2018/0198800 A1* | 7/2018 | Krasser | H04L 63/145 |
| 2019/0026465 A1* | 1/2019 | Ardeli | G06F 21/564 |
| 2019/0087572 A1* | 3/2019 | Ellam | G06F 21/554 |

* cited by examiner

SYSTEM AND METHOD FOR A SECURITY FILEWALL SYSTEM FOR PROTECTION OF AN INFORMATION HANDLING SYSTEM

FIELD OF THE DISCLOSURE

The present disclosure generally relates to a method and apparatus for security control of file accesses for information handling systems in protection against damage caused by malware.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures. Data communications among information handling systems may be via networks that are wired, wireless, optical or some combination. Network communications provide for exchange of data and information including portions of code and other data. In some cases, networked communications open information handling systems to risks of malware, including ransomware, viruses, spoofing software, and the like. Ransomware in particular has become a major threat to users of information handling systems. Malware, such as ransomware, may destroy data as it resides in computer files on an information handling system or may hold computer files hostage in some instances until some condition is met such as a ransom payment.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION OF THE DRAWINGS

Figure 1:
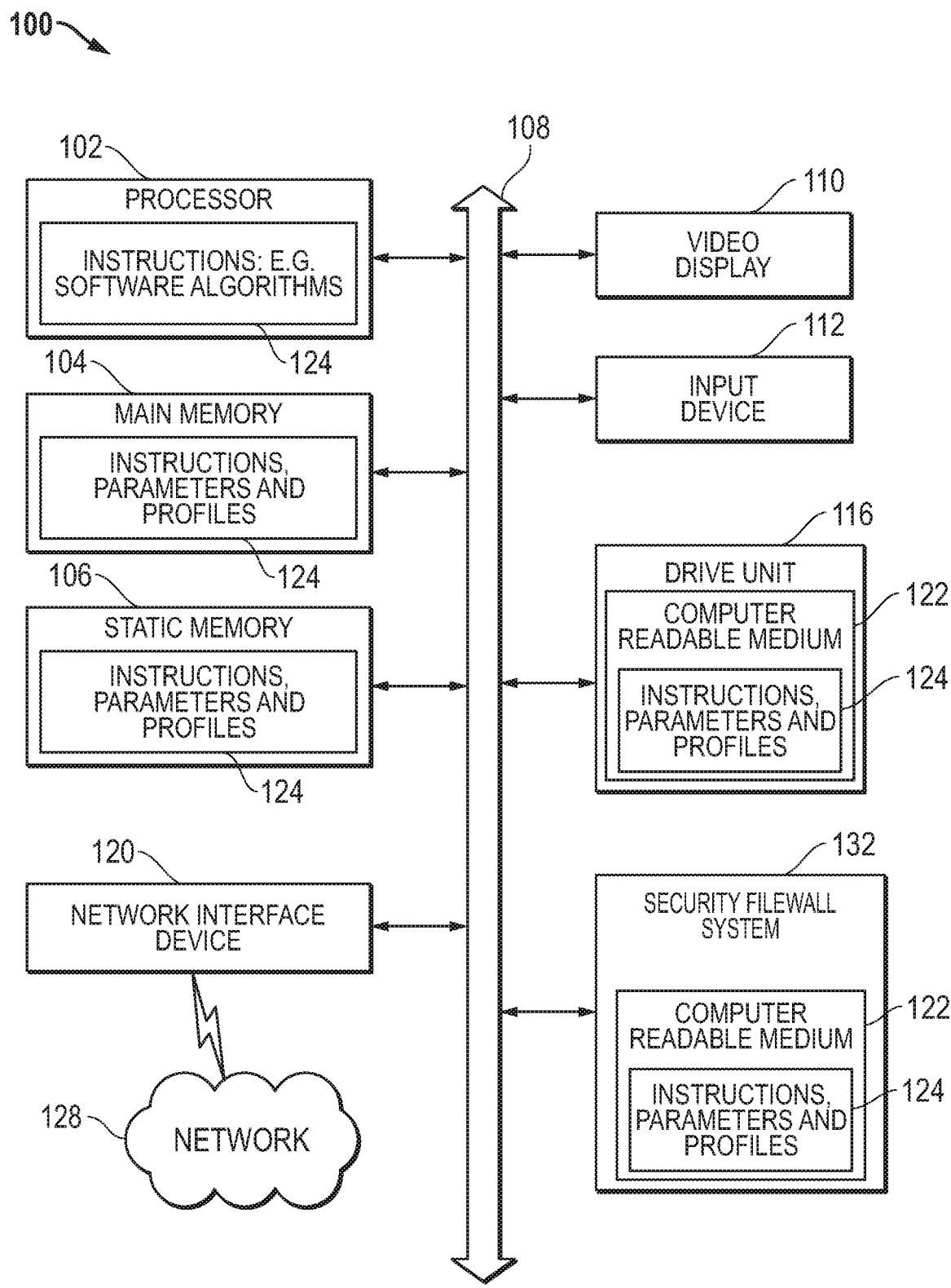
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Networked information handling systems are used in a wide variety of contexts throughout personal and business contexts. Networking of the information handling systems provides for access to a vast array of resources, code, data, and information as well as providing a substantially expanded functionally and communication ability for information handling systems. Unfortunately, network adapters open information handling systems to a variety of potentially negative forms of codes or eavesdropped communications as well as potentially opening access to resources, data or information to unwanted or unauthorized outside systems or users. In particular, malware may "infect" an information handling system leaving the information handling system open to eavesdropping, stolen sensitive information, destroyed files or other problems. For example, "ransomware" is a form of malware that destroys user data residing in computer files or may encrypt those files and only permit access to the files after a ransom is paid to a party forbidding access.

Detection and blocking of ransomware has become important as ransomware itself becomes more prevalent and a greater threat. Current solutions to this problem include the use of antivirus programs and methods to identify and remove malware including ransomware. Suppliers of antivirus programs and methods must first identify and isolate ransomware and place programmatic means to determine if malware is located on a given host information handling system protected by the antivirus program with anti-ransomware capability. The anti-malware supplier isolates a ransomware image at a development laboratory and generates a detection hash which is posted to users of the anti-malware program in periodic updates. The anti-malware program operating on a protected information handling system generates a hash for runtime applications and determines if it matches with the detection hash posted from the anti-malware software. If a match occurs, the runtime application may be discovered to be a source of malware and is isolated or removed. The comparison is based on previous discovery and identification of malware instances at a laboratory and dissemination of a detection hash identifying the same. Such a system may still be problematic upon release of malware or without current updates to anti-malware software applications. Detection of malware will require that the anti-malware supplier have discovered the malware as an initial matter and disseminated a hash and solution. Conventional anti-malware software does not detect abnormal activity occurring via primitive file system operations that may arise when malware is acting.

Embodiments of the present disclosure provide such a solution by providing a framework for processing and inspecting file operations or the data operations on files with a security filewall system to filter various primitive operations to determine if abnormal activity is occurring. Detection of abnormal activity within primitive file system operations may anticipate one or more steps of implementation of destructive malware operation for example. Embodiments of the present disclosure detect abnormal activity with files, operations, intended results, or accesses to capture a log of that activity and determine a level of severity of the abnormal file activity. Depending on the level of severity, activity may be prohibited or denied, the action may be elevated for further processing, or the action may be logged for later reference such as in a queue.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), wearable computing device, a laptop computer, a desktop computer, tablet computer, IoT computing device, a set-top box (STB), server (e.g., blade server or rack server), a consumer electronic device, a network server or storage device, a network router, switch, or bridge, wireless router, or other network communication device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality. In a networked deployment, the information handling system 100 may operate in the capacity of a server or as a client user computer in a server-client user network environment, or as a peer computer system in a peer-to-peer (or distributed) network environment. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more disk drives, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

FIG. 1 shows an information handling system 100 capable of administering each of the specific embodiments of the present disclosure. For example, the information handling system 100 can represent an information handling systems operating one or more aspects of a security filewall system according to embodiments herein while other portions of the security filewall system may operate on remote server systems, in databases, or on other information handling systems. Information handling system 100 may also represent a networked server or other system and administer some or all aspects of the security filewall system via instructions executed on a processor according to various embodiments herein involving remote operation of such systems.

For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets of instructions to perform one or more computer functions.

Information handling system 100 can include devices or modules that embody one or more of the devices or execute instructions for the one or more systems and modules described herein. The information handling system 100 can include a set of instructions 124 that can be executed to cause the computer system to perform any one or more of the methods or computer based functions disclosed herein. For example, instructions 124 may execute a security filewall system, software agents, or other aspects or components. Instructions 124 may execute the security filewall system disclosed herein for operating a file filter to inspect primitive operations on files within an filing system. The security filewall system will utilize a filewall validator to compare aspects of the primitive operation, file name and path, operations, intended destination files or other aspects of the file system operation with a database of filewall rules indicating abnormal operating behavior. Violations of filewall rules will be managed by a filewall violation handler and a communicator may identify the violation, provide a hash, and transmit the same to a user or administrator for further processing or to other malware systems operating on networked information handling systems. In other aspects, violation events may be logged for tracking and further development of filewall rules as needed.

Information handling system 100 may further include a remote or local information handling system operating a firewall rules generator for determination of new firewall rules or modification of existing firewall rules may be conducted. In several embodiments of a firewall rules generator as described herein, statistical analysis on primitive file system operations intercepted may be conducted, intelligent learning algorithms for detection of abnormal operations may be executed, or a user interface may be provided for a user or administrator to modify or create firewall rules to protect an information handling system.

The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the security firewall system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110. The video display 110 in an embodiment may function as a liquid crystal display (LCD), an organic light emitting diode (OLED), a flat panel display, a solid state display, or another type of display. Additionally, the information handling system 100 may include an alpha numeric input device 112, such as a keyboard, and/or a cursor control device, such as a mouse, touchpad, or gesture or touch screen input. For example a graphical user interface (GUI) may be displayed for adjustment or creation of firewall rules for entry into a firewall rules database in some embodiments. Other embodiments may utilize the display 110 to provide a display window to a user or administrator seeking further processing feedback on a detected violation event or other detected attempt at a primitive file system operation detected by the security firewall system of the present disclosure.

The information handling system 100 can also include a disk drive unit 116. The information handling system 100 can also represent a server device whose resources can be shared by multiple client devices, or it can represent an individual client device, such as a desktop personal computer, a laptop computer, a tablet computer, or a mobile smartphone.

Network interface device 120 represents a NIC disposed within information handling system 100, on a main circuit board of the information handling system, integrated onto another component such as processor 102, in another suitable location, or a combination thereof. The network interface device 120 can include another information handling system, a data storage system, another network, a grid management system, another suitable resource, or a combination thereof. Network interface device 120 in an embodiment may operably connect to a network 128. Connection to network 128 may be wired or wireless. It is via a network interface device 120 that a security firewall system communicator may transmit a footprint, hash, or log of violation events to a database or to other information handling systems 100 for use in protection via the security firewall system. In other aspects, a log of violation events may be transmitted to a system for developing further firewall rules.

The network interface device 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The network interface device 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. The network interface device 120 may connect to any combination of macro-cellular wireless connections including 2G, 2.5G, 3G, 4G, 5G or the like from one or more service providers. The network interface device 120 can represent an add-in card, wireless network interface module that is integrated with a main board of the information handling system or integrated with another wireless network interface capability, or any combination thereof.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

Various software modules comprising application instructions 124 may be coordinated by an operating system (OS), and/or via an application programming interface (API). An example operating system may include Windows®, Android®, Linux and other OS types known in the art. Example APIs may include Win 32, Core Java API, or Android APIs. The OS may inspect primitives attempting to operate on the files of a file system and determine rule violations according to operation of the security firewall system of embodiments of the present disclosure.

The disk drive unit 116 and the security firewall system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 also contain space for data storage. In an example embodiment, static memory 106 or disk drive unit 116 or other memory may contain a database of security firewall rules for use by a firewall validator to intercept and compare primitive operations on files in the file system of the information handling system 100. A drive unit 116, memory 104, static memory 106 or any combination may be used to store monitored primitive file system operation logs from the security firewall system of the present embodiments herein.

Further, the instructions 124 may embody one or more of the methods or logic as described herein. For example, instructions relating to the security filewall system software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the security filewall system may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The security filewall system 132 and the drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The security filewall system 132 computer readable medium 122 may also contain space for data storage. The information handling system 100 may also include a security filewall system 132 that may be operably connected to the bus 108. In an embodiment, the security filewall system 132 may communicate with the main memory 104, the processor 102, the video display 110, the alpha-numeric input device 112, the signal generation device 114, and the network interface device 120 via bus 108, and several forms of communication may be used, including ACPI, SMBus, a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipset, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
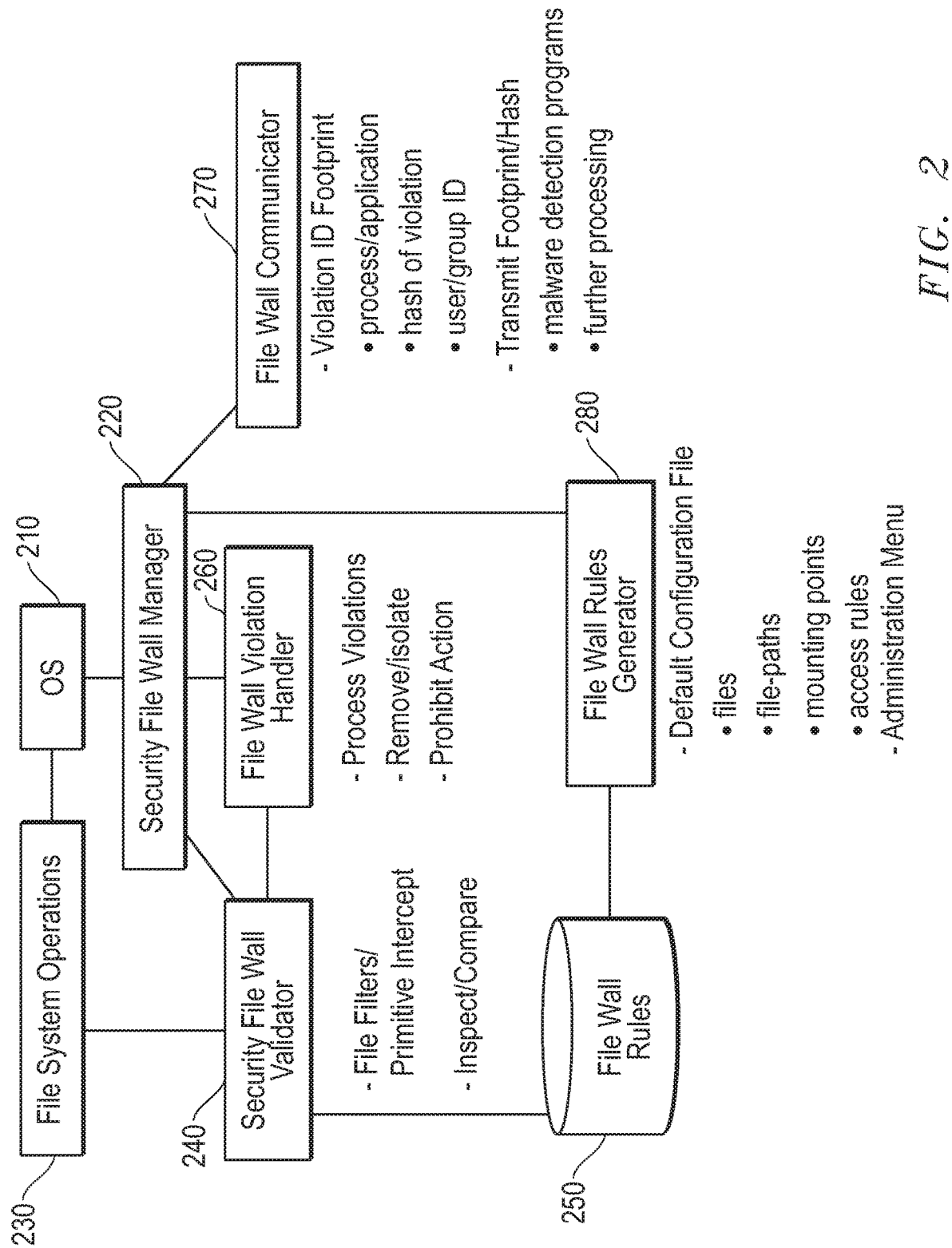
FIG. 2 is a block diagram illustrating a security filewall system according to an embodiment of the present disclosure.

FIG. 2 is a block diagram illustrating a security filewall system according to an embodiment of the present disclosure. As shown in FIG. 2, an information handling system may be used to execute file system operations 230 via an operating system (OS) 210. The OS may be any OS known in the art and may operate via file system particular to that OS. OS 210 may be used to execute code, such as software applications, kernel code, BIOS code or the like which operates runtime operations and may access, utilize, create, convert, or otherwise manipulate files or code stored in the information handling system. Several common manipulation operations may be executed as file system operations 230 by OS 210. Those primitive operations may include file operations such as fs_open, fs_close, fs_read, fs_write, fs_seek, fs_delete, fs_combine, or others understood to be part of the file system operations 230.

At issuance of a request to perform a primitive operation to the OS 210 by application code or other code on the information handling system, the security filewall system is operating to scan for and intercept file system operations including primitives and descriptive arguments for files, file paths, intended destination files, and metadata for executing the file system operation 230. In an embodiment, the security filewall manager 220 may implement a security filewall validator 240 as part of a file filter to intercept attempted primitives operations. In an example embodiment, the OS 210 may operate a file filter driver with a customized dynamic link library which may operate the security firewall system validator 240. In this way, the security firewall system may intercept and inspect primitives and several aspects relating to the attempted operation by the primitive. In another example embodiment, a Linux OS may operate a load/preload operation for intercepting primitives for inspection and link to a library API with the arguments for operation as a firewall system validator 240. Other OS embodiments are understood to be contemplated with analogous file filters operating as security firewall validators 240. The security firewall validators 240 access to a database of firewall rules 250 indicating abnormal operation behaviors for comparison with an attempted primitive operation to determine if a violation event is occurring.

Example firewall rules may include rules such as matching file data to file type such as for write operations, limit an identified user to read operations, forbid file accesses from all except an identified user, forbid reference to a root file system of the information handling system, set all users except an identified user to read only, forbid file deletion, write or other operation from 02:00 to 04:00 or another time period without authorization from a user or an admin, prohibit write operation for entire volume, prohibit operations from a user with elevated user status from guest after access, or other example firewall rules. Each firewall rule may have an associated severity level attributed which may be associated with an action in response.

For example, a firewall rule may not allow a user designated as a guest to access an information handling system to elevate to a user or administrator designation or may be prohibited from performing file system operations or access to files or file types. An elevated guest, or user, may be prohibited from access. For example, a rule expression may be <Read-Only-Access, SeverityX> or <User-Host-Read-Only Access, SeverityX1> may be used. In another embodiment, a firewall rule may limit a primitive file system operation that attempts to operate on a data type such as write a data file having a first data type into a second incompatible data type. For example, to write a pst data type, a doc data type, or an xml data type into a txt data file. This data type mismatch with file type may be forbidden by firewall rules. For example, a rule expression may include <Restrict-Write-To-Same-Data-Type, SeverityX2> Additional examples of rules expressing limitations are: <Limit-change-x %, SeverityX3>, <Forbid-Remote-Access, SeverityX4>, <Limit-Access-To-Time-Of-Day-Ranges, SeverityX5>, <Limit-Access-To-Typical, SeverityXn>, <Limit-Open-Files-to-x>, <forbid-closure-of-File>, and similar type rule expressions to show just a few potential examples.

The security firewall system validator 240 may access to a firewall rules database 250 to cross reference firewall rules relating to primitive operations, files/file paths/volume to be accessed, intended files and the like for users and other aspects of the file system operation 230 being attempted. The firewall rules database 250 is generated by association of rules of access or operations with actions with respect to the file, file path or volume in the event a rule is violated. The firewall rules database 250 may be partially established by a firewall rules generator 280. The firewall rules generator 280 provides for associations between firewall primitive actions to be attempted, the user making the access and aspects of the access that may indicate a different user, files attempted for access and access rights, similar access rights for file paths and mounting points for volume of files, as well as proposed destination files or results of primitive actions on files. For firewall rules around particular data files, firewall rules may specify limitations on users, groups, permissions, operation conditions (time of day, size or type of operation, etc.), application seeking access as well as other aspects of access to a file.

The firewall rules generator 280 may receive determinations of firewall rules populated based on known abnormal behaviors which commonly relate to operation of malware including indications of spoofing or executions that may indicate ransomware or unauthorized access or monitoring. Additionally, firewall rules may be received or modified via an administrative menu such that a user or an administrator of an information handling systems within an enterprise may customize or update the firewall rules as desired. In yet other embodiments, a central server may provide for updated rules which may be established due to detection of abnormal operation aspects occurring on other information handling systems in a relationship list such as those in an enterprise or subscribing to a security firewall system service. In a further aspect, the system may learn which behaviors of file system operations 230 are out of the norm for a user based on statistical information of primitives operations being conducted over time. By logging successful attempted primitive file system operations including associated arguments and metadata defining the circumstances of the attempted primitive file system operation, a statistical baseline normal of operations may be established for those primitive file system operations with respect to aspects of the operation such as a file, file path, file type, an action, a destination file or type, a file format, access rules, type of application or code operating, reference to root or sub-file systems permitted, user permissions, read or write permissions, and the like. In another embodiment, an intelligent learning algorithm may assess logs of successful primitive file system operations, violation events received remotely or locally, and primitive file system operation circumstances such as arguments and metadata to determine abnormal operations occurring in primitive file system operations.

If a firewall rule has been violated for a file, file path, intended destination, user, operation or other aspect of an intended file system operation 230, the security firewall manager 220 will implement a firewall violation handler to process the violation. In an aspect, if a violation event is detected and the rule violated indicates a high severity level in the firewall rules database 250, the file operation of the primitive will be rejected and the security firewall manager 220 will return a failure with the OS and log the firewall rule violation. Upon prohibition of the primitive operation, the firewall violation handler 260 may identify the code issuing the attempted primitive operation and may either remove or isolate that code in its entirety from operating.

In another aspect, if a firewall rule has been violated and the rule violated indicates a lesser severity level, such as a medium severity level attempted operation, in the firewall rules database 250, then the file operation of the primitive will be logged as a firewall rule violation and the violation event submitted for further processing. In some aspects, the file system operation may be suspended. For example, the violation event may be submitted for further processing by elevating a notification of the action to a user or to an administrator for the information handling system for review and approval of the action. If approval is granted, the file system operation may proceed. Otherwise, the file system operation triggering the violation event may be halted.

In other embodiments a low severity level violation event may be detected from an attempted file system operation. In such an embodiment, the firewall violation handler may provide for the file system operation to continue, but may log the violation event in a queue until such number of similar violation events reach a threshold level. Upon reaching a threshold level, the violation event may be submitted for further processing. In some embodiments, file system operations 230 may be logged for successful events versus rule violations of various levels of severity classification. Logging non-violations may provide for a baseline of regular operations of the file system in the information handling system. Logging violation events, particularly lower severity classified events may indicate an ongoing attack and a potential need to elevate a severity level in some embodiments. If prohibition of the primitive operation is determined after elevation for further processing in some embodiments, then the firewall violation handler 260 may be directed to identify the code issuing the attempted primitive operation and may either remove or isolate that code in its entirety from operating.

Identification of a firewall rule violation may include a footprint identification indicating an impacted file or files, file path, volume, intended file result destination, user (purported or actual), group, operation, access rule or other rule violated, identification of code issuing the file operation causing the violations, and identifiers related to that code. In an example embodiment, a tuple of identifying information may be sent in addition to a hash algorithm may be applied to the binary image of the identification of the violation event including hashed information relating to the instance of runtime execution of the violation event such as identification of the script or ordering of attack vectors used. Any type of hashing algorithm may be used including, but not limited, to SHA-1, SHA-2, SHA-3, HAVAL, MD4, MD5, SHA-0, and RIPEMD-128/160. The violation event identification footprint and/or identifying hash may be prepared by the security firewall manager 270 and prepared for communication to a user, an administrator, malware detection programs, or other relationship list. The security firewall manager system 270 may link with a firewall communicator 270. The firewall communicator 270 may operate to transmit the footprint identification and/or hash to a malware detection system operating at a centralized server location, operating on other information handling systems, operating as part of a wider firewall rules learning system, or the like for communication and warning to others of the potential for malware or for analysis and determination of whether malware has arisen and been detected. Transmission may be via a network interface for communication to networked resources such as a centralized server, administrative information handling system, or other information handling systems as part of a security firewall relationship list. In other embodiments, the firewall communicator 270 may indicate via a GUI to a user that an abnormal activity or ongoing abnormal activity has been detected and request further instruction before proceeding. Response from a user or administrator is an example of further processing of the violation event determination. Response from other centralized systems, including verifications received from other systems of similar behaviors, may also constitute further processing in confirming the abnormality of the attempted operation flagged as a violation event.

Figure 3:
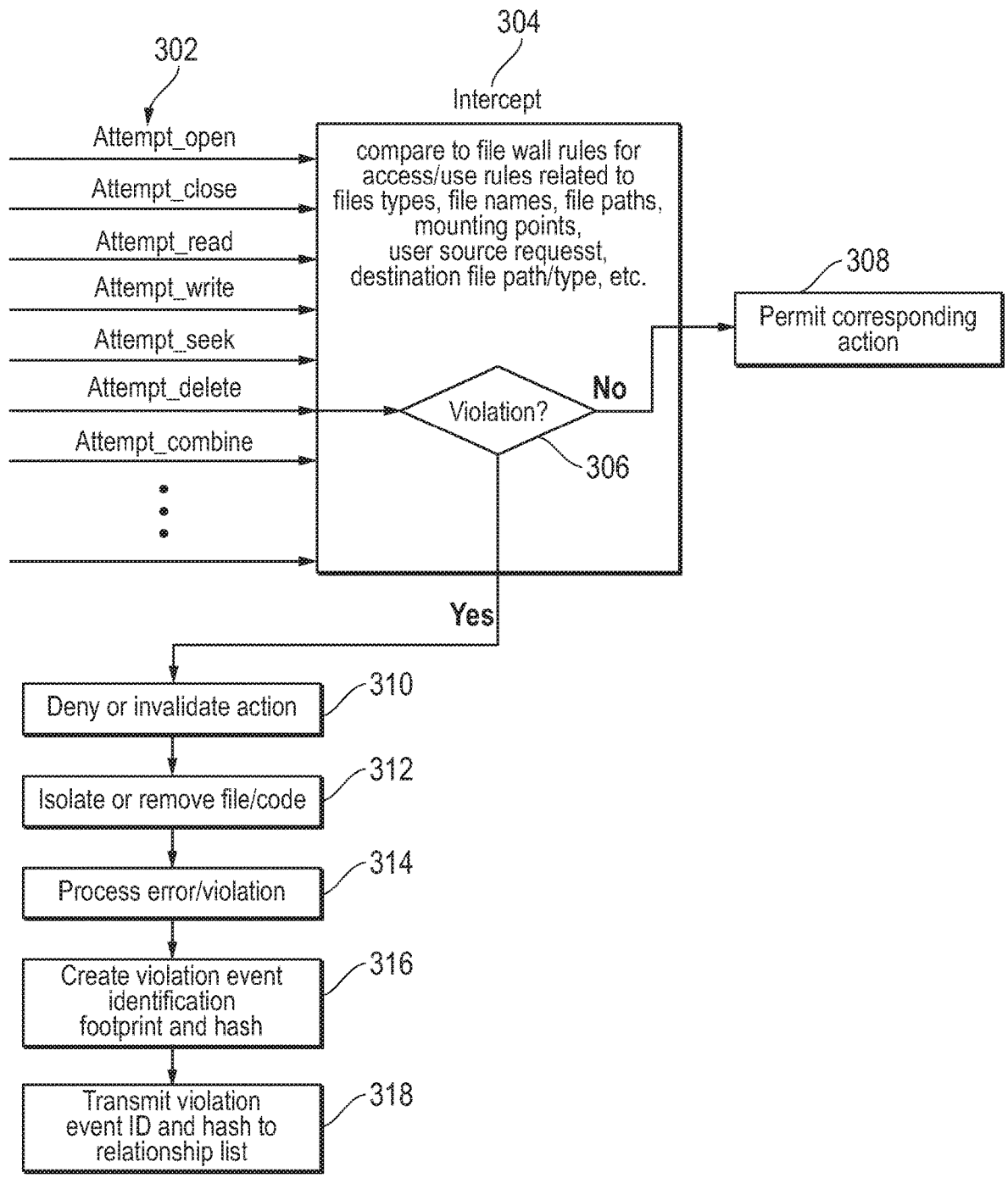
FIG. 3 is a flow diagram illustrating a method of operating a security filewall system for an information handling system according to an embodiment of the present disclosure.

FIG. 3 is a flow diagram illustrating a method of operating a security firewall system using a file filter 304 for validation of attempted primitive operations 302 according to an embodiment of the present disclosure. At block 302, a plurality of primitives are shown as types of file system operations that may be attempted by the OS. The examples shown at 302 include a file system open, a file system close, a file system read, a file system write, a file system seek, a file system delete, a file system combine, and other operations understood to be part of file systems. One or more primitive file system operations may be implemented by malware to commit damage, encrypt, eavesdrop, steal or otherwise access or damage files. Determination of one or more abnormal primitive files system operations may be used to detect and prevent malware execution.

At block 304, in an embodiment, an OS may execute a file filter to intercept and inspect file operation instructions proposed by code, script, applications, or the like in an information handling system. This file operation instructions are also referred to as attempted primitive operations on files, file paths, destination files, or the like in the information handling system. The file filter may intercept the attempted primitives and associated arguments in the request to execute a file system operation and provide the details for inspection.

In an embodiment of the present disclosure, the file filter at 304 intercepts the attempted primitive and associated arguments defining the requested file operation and a DLL or other API library of instructions and data will inspect the requested file system operation. At 306, the filewall validator operating as the file filter at 304 will cross reference a filewall rules data base to determine if, for a given file or file path identifier, an access rule or operational rule is violated form the filewall rules. The file system operation request may contain associated arguments and metadata that define the nature of the requested file system operation. These include access requests, use request, requesting user identification, file types, file names, file paths, volumes, mounting points for access, destination file path or type, formatting used with destination file, and metadata such as timestamps, frequency of request, and other data. Aspects of the intercepted primitive including the operation type and the file name and type requested for the operation may be then cross referenced with a filewall rules database. If no rule for the file name or file type is violated by the operation request, associated arguments or metadata defining the attempted operation, then flow proceeds to 308 where execution of the primitive operation according to the parameters requested is permitted to proceed.

If a rule for the file name or file type is violated by the operation request, associated arguments or metadata defining the attempted operation, then flow proceeds to 310. In an embodiment, the detection of a violation event at 306 may trigger one of several responses by the security filewall system. Any combination of responses may occur including denial or invalidation of the attempted file system operation 310, isolation or removal of files or code that attempted the file system operation 312, processing of the error or violation 314 to a user, administrator or centralized system for determination, comparison to other events, or a determination of further action necessary. Which response or combination of responses are implemented may depend on the attributed severity of the determined violation by the attempted operation. More drastic measures will be taken by the security filewall system with a higher severity attribution to the violation. For example, isolation or removal of code or files 312 that instituted the attempted operation may be a drastic response reserved for highest-level severity classifications of the violations. Similarly, denial of a file system operation 310 may similarly be reserved for severity level classifications on the higher end of the classification levels. In some instances, a denial of an attempted operation 310 may be a suspension while further processing is sought. In such a case, the severity level classification of the violation event may be lower than a classification that triggers an automatic denial or invalidation of an attempted action. Further processing of the error or violation 316 may be applied to both moderate and severe classification levels of violation events.

In other aspects, violation events may be logged for future reference in determination of additional or changing firewall rules for ongoing protection of the information handing system. Flow may proceed to 316 where a footprint identification of the details of the violation event, such as the affected file name, file path identifier, operation, or rule violated may be created to identify the violation event in the log. Further, a hash footprint of the identifying aspects of the attempted file system operation including associated arguments and metadata defining aspects of the attempted operation that constitutes a violation event may be hashed. The hashing provides for easier identification of the violation event rather than providing details of a binary image of the violation event which may require substantial data to convey.

Proceeding to 318, the security firewall system may utilize a firewall communicator to transmit the violation event identification footprint or hash of the description of the violation event to a relationship list for notification of the violation event occurrence and as a warning through an anti-malware system or to administrators or other users of the potential for malware.

At this point, aspects of the process for operating the security firewall system may end however it is understood that the firewall validator may continuously monitor at 304 for various primitive requests 302 for inspection of attempted file system operations and detection of abnormal activity that violates firewall rules. Further, the firewall rules may be updated or feedback may be provided to the security firewall system manager detailing modifications to rules, severity level attributions, or firewall system responses to detection of various violations.

The blocks of the flow diagram of FIG. 3 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Figure 4:
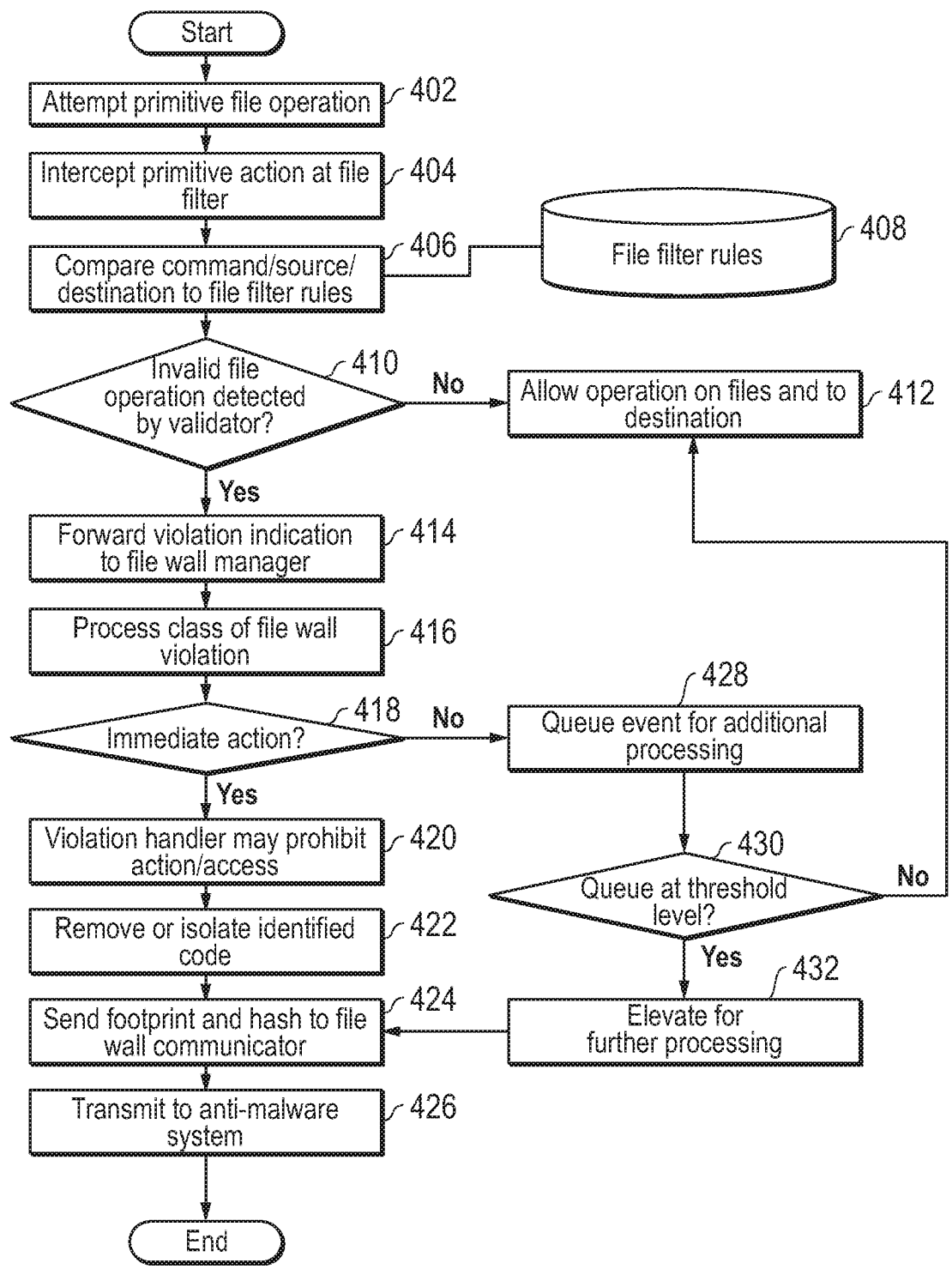
FIG. 4 is a flow diagram illustrating a method of executing a security filewall system for an information handling system according to another embodiment of the present disclosure

FIG. 4 is a flow diagram illustrating a method of operating a security firewall system for validation of attempted primitive operations according to an embodiment of the present disclosure. At block 402, an attempted primitive is submitted by an application, script, or other form of runtime executable code as file system operation submitted to the OS. Several examples of primitive operations that may be attempted include a file system open, a file system close, a file system read, a file system write, a file system seek, a file system delete, a file system combine, and other operations. Several are discussed in embodiments herein.

Proceeding to 404, the OS implements a file filter to intercept the primitive action of the attempted file system operation. The file filter may operate a security firewall validator as executable code for inspection of the attempted file system operation, associated arguments, file accesses, file types, and intended destination file or result. In an example embodiment, the file filter driver may operate as a data link library (DLL) set of code executed to detect a primitive operation and to inspect the primitive. The file system filter driver may be operated with a file system driver stack by the OS, such as Windows® to load one or more groups of drivers at system startup. In the example embodiment of Windows®, the file system filter driver is a kernel or use mode component that may run as part of the OS. The file system filter drive may filter operations for one or more file systems or one or more file system volumes in an information handling system. The file system filter driver may have several aspect of operation including logging, observing, modifying or preventing operations submitted to the information handling system. The file system filter driver may operate conventional antivirus utilities for example.

At 406, the firewall validator may access a set of stored file filter rules 408. The firewall validator will operate to compare the requested action, the source and requested access file/file path/volume or the like, and the destination file/file path/volume or other result to the file filter rules. In an example embodiment, the file filter rules 408 may be sorted by file/file path/volume to which access is sought to perform the primitive operation. A set of rules relating to that file or file path or volume is assessed by the firewall filter. The set of rules may associate the file/file path/volume to which access is sought with several forbidden actions, destination files/file paths/volumes, user activity (such as without administrative rights or authorization), or the like. The firewall rules are also associated with a severity level designation which includes one or more actions to be performed when a rule violation is detected. Some example rules expressions on file limitations are: <Read-Only-Access, SeverityX>, <User-Host-Read-Only Access, SeverityX1>, <Restrict-Write-To-Same-Data-Type, SeverityX2>, <Limit-change-x %, SeverityX3>, <Forbid-Remote-Access, SeverityX4>, <Limit-Access-To-Time-Of-Day-Ranges, SeverityX5>, <Limit-Access-To-Typical, SeverityXn>, <Limit-Open-Files-to-x>, <forbid-closure-of-File> among others as described herein.

At 410, the comparison of the detected primitive at the firewall validator will determine if a rule associated with a file/file path/volume has been violated. If not, flow will proceed to 412 where the file system driver performs the operation on the files and allows the result to proceed. For example, the result may be a resulting set of destination files. In some embodiments, the security firewall manager will log the permitted operation and related arguments, metadata, and other defining aspects as well as the normal or success status of the attempted operation. This data may be provided to a firewall rules generator to establish a baseline of normal operations for comparison to generate rules identifying abnormal activity for the firewall rules relating to a file/file path/volume of stored files.

If a violation event is detected at 410 however, flow may proceed to 414 where the violation event is forwarded to a security firewall manager for coordination among the firewall violation handler and the security firewall communicator. The firewall security manager may log the violation event for the firewall rules generator including identifying footprint information about the violation event and an identifying binary image or a hashed version of the same of the violation event.

The flow proceeds to 416 where the firewall manager may invoke a firewall violation handler to process the violation event to determine a severity level of the firewall violation event and determine action in response accordingly. In some embodiments, the violation event may be a severe event in which it is logged as such and understood to be unacceptable activity for which drastic action may be needed. In other embodiments, one of several severity levels may be designated such that those more moderate severity levels may not trigger drastic or immediate action but, taken as a whole, may indicate operation of one or more attack vectors of malware.

At 418, the firewall violation handler will first determine if an immediate action is necessary. If so, the flow proceeds to 420. Depending on the severity level assigned to the violation event, such as the sensitivity of the file or file path for which unauthorized access is attempted, the violation handler may respond to the file system driver of the OS to prohibit the action or forbid the access. The security firewall system manager will log the attempted operation as a failure or null and record the same for later utilization. In some embodiments, the security firewall handler will execute code to identify the script, application, or other code issuing the attempted file system operation that constituted the firewall violation event. The file system driver may be instructed to isolate or remove the offending code at 422.

At 424, the security firewall manager will collect identification details of the attempted file system operation that was determined to be a violation event for a violation event footprint identification. For example, a tuple may be used as the footprint identification including information about the file affected or attempted to be accessed, the operation attempted, and the rule violated. In addition, details of a binary image defining the code or attempted file system operation, including details about the associated arguments defining the attempted operation and metadata (time, user, code type requesting, etc.) describing the circumstances of the attempted operation may be hashed for ease of communication and for security. A hash algorithm may be applied to the binary image of the above defining aspects of the code or attempted operation that violates one or more of the firewall rules. The binary image before hashing or after hashing may be linked with the footprint identification of the violation event.

The security firewall manager may forward the violation event hash and identification footprint to the firewall communicator to transmit the occurrence of the violation event at 426. In various embodiments, the firewall communicator may transmit the identification footprint and hash to a relationship list of other information handling systems such as an administrator, other subscribers to an anti-malware system, or other users within an enterprise whose security is managed by a central administration. It is understood that transmission of the violation event as a warning may be transmitted to any relationship list of information handling systems or users.

Returning to 418, if no immediate action is required upon the determination of a violation event due to a lower level of severity level, then flow will proceed to 428. For example, a moderate severity level may be attributed to the detected violation event. In such an embodiment, the violation event may be stored in a queue in memory to record occurrences of this type of violation event. The violation event may be queued based on similarities in primitive operation type, file/file path attempted for access, firewall rule violated, or any combination. In other embodiments, violation events may be queued based on hash identification or any single identifying aspect of the binary image of the violating attempted file system operation. If at 430, the queue has not reached a threshold number of similar violation events, flow may proceed as normal to 412 and the file system driver may be permitted to proceed with the attempted operation on the files to yield the desired result. A log of the violation event is also recorded and may be used with the security firewall rules generator.

If at 430 however, the queue has reached a threshold number of similar violation events, flow may proceed to 432 to conduct further processing on the violation event. In an example embodiment, the violation event may be elevated to a user or an administrator for review of the attempted file system operation. The attempted operation may be suspended while the violation event is under review. The course of the review may include a request to proceed with the attempted operation via a GUI request window seeking authorization to proceed. The request window seeking authorization or further processing may include details about the detected violation event, operations, files involved, code operating, or the like. The authorization window may further include links or selections for immediate action such as removal of code or access to a firewall rules generator to create a new firewall rule. If authorization is granted by a user or administrator, then flow proceeds to 412 (not shown) where the file system driver may proceed with the attempted operation and the response is recorded as a factor with the log of the firewall violation event that authorization was provided. In another aspect, permission may be denied by a user or administrator in which case the firewall violation handler may prohibit the operation or the access to the file of file path. Similarly, this further processing may be logged as well with the violation event or successful attempted primitive file system operation (if approved) for further reference by a firewall rules generator.

In other embodiments, further processing at 432 may be conducted by the firewall rules generator may assess the level or frequency of the abnormal violation event to determine whether an ongoing attack is occurring or whether activity is not characteristic for a user. This may be compared to a baseline of regular operations to determine whether an abnormal operation or set of operations is being attempted.

Upon further processing, the flow may proceed to 424 for establishing a violation event footprint identification and a hash of the binary image of identifying aspects of the attempted operation that constituted a violation event. As before, flow proceeds to 426 where the security firewall communicator may transmit the identification footprint and the hash of the violation event to other information handling systems on a relationship list. For example, the identification footprint and the hash of a violation event may be transmitted to an administrator or to a centralized anti-malware system. At this point the flow may end.

The blocks of the flow diagram of FIG. 4 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram. For example, prohibition of action or access may occur contemporaneously or in any order with respect to removing or isolating the identified source of the violation event, establishing a footprint identification and hash, or preparing the transmission of the violation event occurrence to other information handling systems.

Figure 5A:
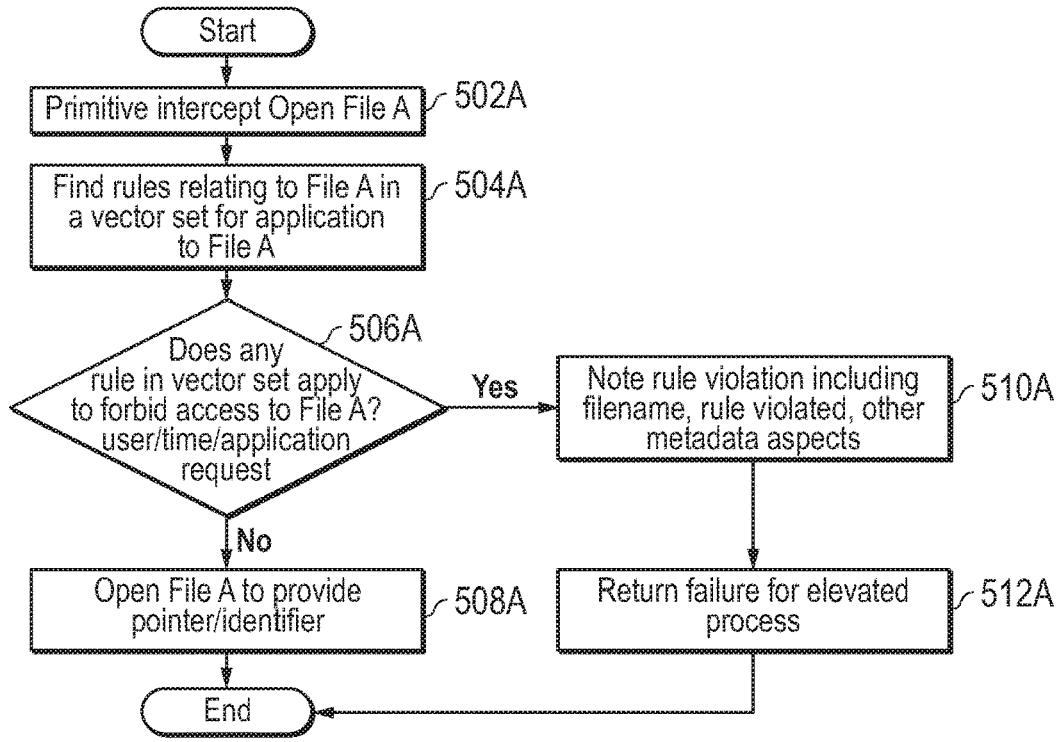
FIG. 5A is a flow diagram illustrating operation of a security filewall system for an information handling system according to another embodiment of the present disclosure.

FIG. 5A shows an example method embodiment of a security firewall system rule assessment via the security firewall system according to an embodiment of the present disclosure. FIG. 5A illustrates an example of a security firewall system rule assessment for a "Open File A" operation attempted via the file system of an information handling system. Flow begins at 502A where a file filter operating a security filewall validator may intercept the primitive for a "Open File A" operation. The file filter system may operate in connection with the file system stack for the operating system and additionally operate a custom file filter driver relating to the security filewall validator described according to embodiments herein. Proceeding to 504A, the security filewall validator will search a filewall rules database for all rules relating to File A. In an embodiment, the filewall validator will establish a vector set of rules relating to File A. Then this vector set of rules relating to File A may be compared or reviewed in relation to the defining aspects of the attempted "Open File A" operation on File A.

At 506A, the filewall validator will determine if any rule in the vector set of rules applicable to File A forbid access to File A. The forbidden access may be based on security level of file A such as the designation of personal information or high security files or designation of files only for operation with certain software applications. In other embodiments, access to File A may be restricted as an administrative file for the information handling system. Associated arguments with the operation of "Open File A" may be considered including the requesting application, script or other code requesting the file system open operation. Additionally, the type of operation, destination location, destination file formats, changes to file formats may further be considered as part of the arguments defining the "Open File A" requested action as applicable. Associated metadata relating to the attempted file system open request for File A may also be considered such as the user requesting the file system open action and metadata information such as time of day of the requested operation to establish normalcy of the request by this user.

In some specific examples of FIG. 5A, File A may be restricted as to access to particular applications or code, as to level of security required to access, or as to the user requesting. For example a filewall rule may include <Limit-Open-Files-to-x, SeverityX> where x may be associated with a particular requesting application program type, a time of day, a user, or a similar limiting parameter.

If no rule in the vector set of filewall rules applicable to File A applies to the operation "Open File A" or the associated aspects of the operation in the arguments or metadata surrounding the attempted operation, then flow may proceed to 508A. At 508A, the file system drivers may proceed to execute the "Open File A" operation as requested and may provide a pointer or identifier to the requesting code as to the location of File A within a volume of storage. In some embodiments, a successful open action in response to the attempted "Open File A" may be recorded and logged for assessment of baseline levels for this type of action in a Filewall Rule Generator. At this point, the process may end. If the security filewall system validator determines that one or more rules does apply to the attempted "Open File A" operation however, then flow may proceed to 510A.

At 510A, the filewall validator will log the rule violation or rules violations with the security filewall manager including recording the filename affected (File A) and the rule violated as part of a violation event footprint and log the aspects of the attempted "Open File A" and other associated argument or metadata aspects of the requested operation that may be identifying as part of an image of the violation event. In some embodiments, some or all of the violation event identification footprint may be included as part of the image of the violation event and later be hashed along with the image. In other embodiments, a separate identification footprint may be associated with the image of the violation event or any hash thereof to provide for categorization or utilization. Flow may further proceed to 512A where the filewall manager receives an indication of failure and may elect to send the violation event identification or hash to a filewall communicator for transmission to an administrator, user, anti-malware system centralized at a remote location, or other information handling systems. Further processing may include analysis by a user or administrator and determination about whether the operation "Open File A" as requested is acceptable or an indication of a malware issue. Similarly, details of an event failure and any further processing may be sent to a filewall rule generator to further establish a rule or its severity level setting by adding a statistical data point used to determine the veracity of the rule or to reduce its reliability as a necessary filewall rule. At this point, the process may end.

Figure 5B:
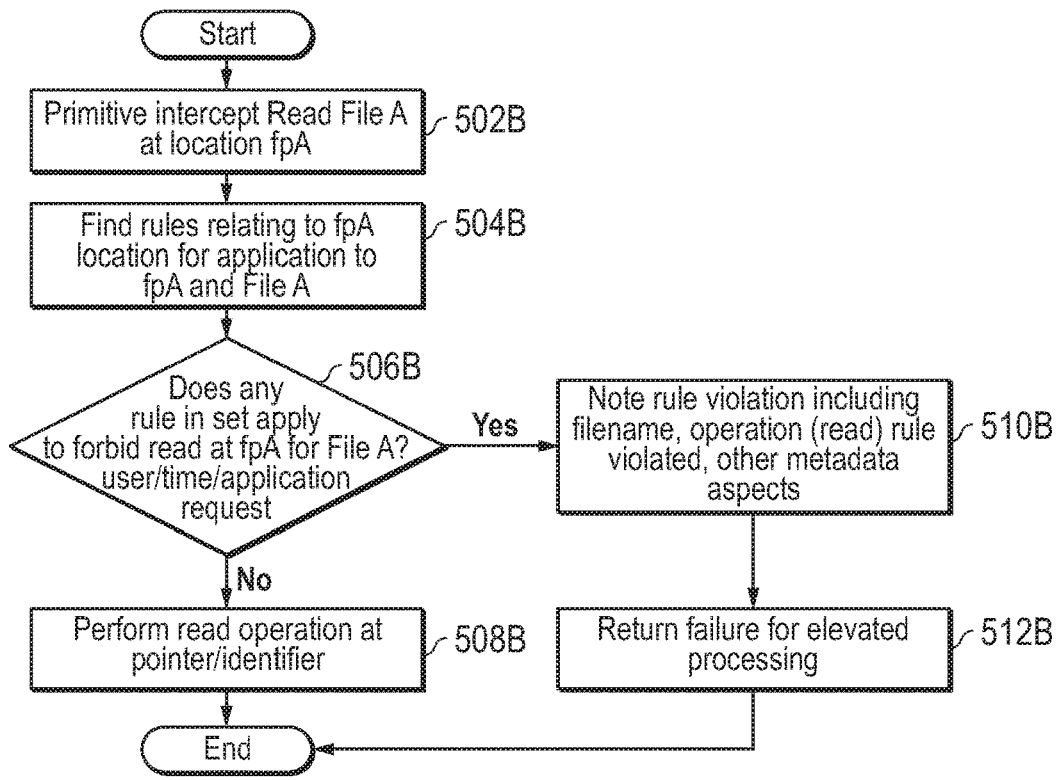
FIG. 5B is a flow diagram illustrating operation of a security filewall system for an information handling system according to another embodiment of the present disclosure.

FIG. 5B shows an example method of a security filewall system rule assessment via the security filewall system according to another embodiment of the present disclosure for a different primitive file system operation. FIG. 5B illustrates an example of a security filewall system rule assessment for a "Read fpA" operation attempted via the file system to read File A at location fpA by a code operating on the information handling system. Flow begins at 502B where a file filter operating a security filewall validator may intercept the primitive for a "Read fpA" for "File A" operation. As described, the security filewall validator may operate as a custom file filter driver as part of a file filter as described according to embodiments herein. Proceeding to 504B, the security filewall validator will search a filewall rules database for all rules relating to pointer location fpA. In another embodiment, the filewall validator may also search the filewall rules database for rules relating to File A that may also be applicable. In an embodiment, the filewall validator will establish a vector set of rules relating to location fpA, File A, or both. Then this vector set of rules relating to pointer location file path fpA or File A may be compared or reviewed in relation to the defining aspects of the attempted "Read fpA" operation to read File A.

At 506B, the filewall validator will determine if any rule in the vector set of rules applicable to fpA forbids a read of File A or that location or file path. The forbidden read operation may be based on security level of the location fpA, File A, or availability of files along that file path which may be designated as high security, such as a designation of personal information or high security files. In other example embodiments, the file path location fpA or files at a given location may be limited to read-only for only certain authorized software applications, users, at certain times or having similar restrictions. Associated arguments with the operation of "Read fpA" may be considered including the application, script or other code requesting the file system run a read operation at fpA. Additionally, the type of operation, destination location, destination file formats, changes to file formats may further be considered as part of the arguments defining the "Read fpA" requested action as applicable. Associated metadata relating to the attempted file system read request at fpA may also be considered such as the user requesting the file system read action and metadata information such as time of day of the requested operation to establish normalcy of the request by this user.

In some specific examples of FIG. 5B, read operations to location fpA or read operations on File A may be restricted as to access by specified applications or code, as to level of security required to access, or as to the user requesting the read. For example a filewall rule may include <Read-Only-Access, SeverityX>, <User-Host-Read-Only Access, SeverityX1>, <Limit-change-x %, SeverityX3>, <Forbid- Remote-Access, SeverityX4>, <Limit-Access-To-Time-Of-Day-Ranges, SeverityX5>, <Limit-Access-To-Typical, SeverityXn>, among other read limitations.

If no rule in the vector set of firewall rules applicable to location fpA or File A applies to the operation "Read fpA" or the associated aspects of the operation in the arguments or metadata surrounding the attempted operation, then flow may proceed to 508B. At 508B, the file system drivers may proceed to execute the "Read fpA" operation of File A as requested at the pointer or identifier to location of File A within a volume of storage. In some embodiments, a successful read action in response to the attempted "Read fpA" may be recorded and logged for assessment of baseline levels for this type of action in a Filewall Rule Generator. At this point, the process may end. If the security firewall system validator determines that one or more rules do apply to the attempted "Read fpA" operation however, then flow may proceed to 510B.

At 510B, the firewall validator will log the rule violation or rules violations with the security firewall manager including recording the filename affected (File A), the file location (fpA), and the rule violated as part of a violation event footprint and log the aspects of the attempted "Read fpA" action and other associated argument or metadata aspects of the requested operation that may be identifying as part of an image of the violation event. In some embodiments, some or all of the violation event identification footprint may be included as part of the image of the violation event and later be hashed along with the image. In other embodiments, a separate identification footprint may be associated with the image of the violation event or any hash thereof to provide for categorization or utilization.

Flow may further proceed to 512B where the firewall manager receives an indication of failure and may elect to send the violation event identification or hash to a firewall communicator for transmission to an administrator, user, anti-malware system centralized at a remote location, or other information handling systems. Further processing may include analysis by a user or administrator and determination about whether the operation "Read fpA" as requested is acceptable or an indication of a malware issue. Similarly, details of an event failure and any further processing may be sent to a firewall rule generator to further establish a rule or its severity level setting by adding a statistical data point used to determine the veracity of the rule or to reduce its reliability as a necessary firewall rule. At this point, the process may end.

Figure 5C:
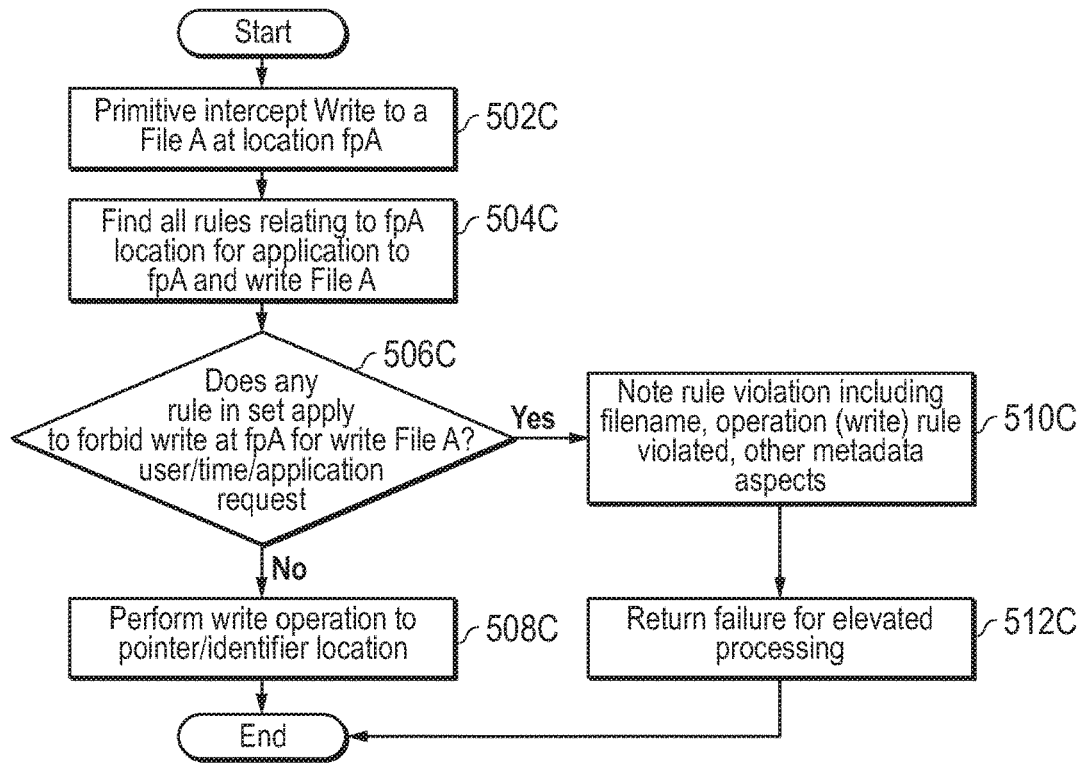
FIG. 5C is a flow diagram illustrating operation of a security filewall system for an information handling system according to another embodiment of the present disclosure.

FIG. 5C shows an example method of a security firewall system rule assessment via the security firewall system according to another embodiment of the present disclosure for a yet another type of primitive file system action. FIG. 5C illustrates an example of a security firewall system rule assessment for a "Write fpA" operation attempted via the file system to write to File A at location fpA by a code operating on the information handling system. Flow begins at 502C where a file filter operating a security firewall validator may intercept the primitive for a "Write fpA" for "File A" operation. As described, the security firewall validator may operate as a custom file filter driver as part of a file filter as described according to embodiments herein. Proceeding to 504C, the security firewall validator will search a firewall rules database for all rules relating to pointer location fpA. In another embodiment, the firewall validator may also search the firewall rules database for rules relating to File A that may also be applicable. In an embodiment, the firewall validator will establish a vector set of rules relating to location fpA, File A, or both. Then this vector set of rules relating to pointer location file path fpA or File A may be compared or reviewed in relation to the defining aspects of the attempted "Write fpA" operation to write to File A.

At 506C, the firewall validator will determine if any rule in the vector set of rules applicable to fpA forbids a write to File A or that location or file path. The forbidden write operation may be based on security level of the location fpA, File A, or availability of files along that file path which may be designated as high security, such as a designation of personal information or high security files. In another example embodiment File A or all files at the location fpA may be designated read-only and thus a write may indicate operation of malware. In other example embodiments, the file path location fpA or files at a given location may be limited to write operations by only for operation with certain authorized software applications. Associated arguments with the operation of "Write fpA" may be considered including the requesting application, script or other code requesting the file system run a write operation at fpA. Additionally, the type of operation, destination location, destination file formats, changes to file formats may further be considered as part of the arguments defining the "Write fpA" requested action as applicable. Associated metadata relating to the attempted file system write request at fpA may also be considered such as the user requesting the file system write action and metadata information such as time of day of the requested operation to establish normalcy of the request by this user.

In some specific examples of FIG. 5C, write operations to location fpA or write operations to File A may be restricted as to access by specified applications or code, as to level of security required to access, or as to the user requesting the write function. For example a firewall rule may include a limitation on a write operation seeking a write all for a set of files such as from or to a volume, a directory location or the like which may indicate operation of malware attempting a disk encryption or a partial disk encryption or other unauthorized encryption. Metadata indicating a write fpA that includes both File A and all other files in a volume, directory, or other group of files may flag a violation event in an example embodiment. For example, a plurality of firewall rule may include <Restrict-Write-To-Same-Data-Type, SeverityX2>, <Limit-change-x %, SeverityX3>, <Forbid-Remote-Access, SeverityX4>, <Limit-Access-To-Time-Of-Day-Ranges, SeverityX5>, <Limit-Access-To-Typical, SeverityXn>, <Limit-Open-Files-to-x, SeverityXn+1>, among other firewall "Write" rules.

If no rule in the vector set of firewall rules applicable to location fpA or File A applies to the operation "Write fpA" or the associated aspects of the operation in the arguments or metadata surrounding the attempted operation, then flow may proceed to 508C. At 508C, the file system drivers may proceed to execute the "Write fpA" operation to File A as requested at the pointer or identifier to location of File A within a volume of storage. In some embodiments, a successful write action in response to the attempted "Write fpA" to File A may be recorded and logged for assessment of baseline levels for this type of action in a Filewall Rule Generator. If the security firewall system validator determines that one or more rules do apply to the attempted "Write fpA" operation however, then flow may proceed to 510C.

At 510C, the firewall validator will log the rule violation or rules violations with the security firewall manager including recording the filename affected (File A), the file location (fpA), and the rule violated as part of a violation event footprint and log the aspects of the attempted "Write fpA"

action and other associated argument or metadata aspects of the requested operation that may be identifying as part of an image of the violation event. In some embodiments, some or all of the violation event identification footprint may be included as part of the image of the violation event and later be hashed along with the image. In other embodiments, a separate identification footprint may be associated with the image of the violation event or any hash thereof to provide for categorization or utilization.

Flow may further proceed to 512C where the firewall manager receives an indication of failure and may elect to send the violation event identification or hash to a firewall communicator for transmission to an administrator, user, anti-malware system centralized at a remote location, or other information handling systems. Further processing may include analysis by a user or administrator and determination about whether the operation "Write fpA" as requested is acceptable or an indication of a malware issue. Similarly, details of an event failure and any further processing may be sent to a firewall rule generator to further establish a rule or its severity level setting by adding a statistical data point used to determine the veracity of the rule or to reduce its reliability as a necessary firewall rule. At this point, the process may end.

Figure 5D:
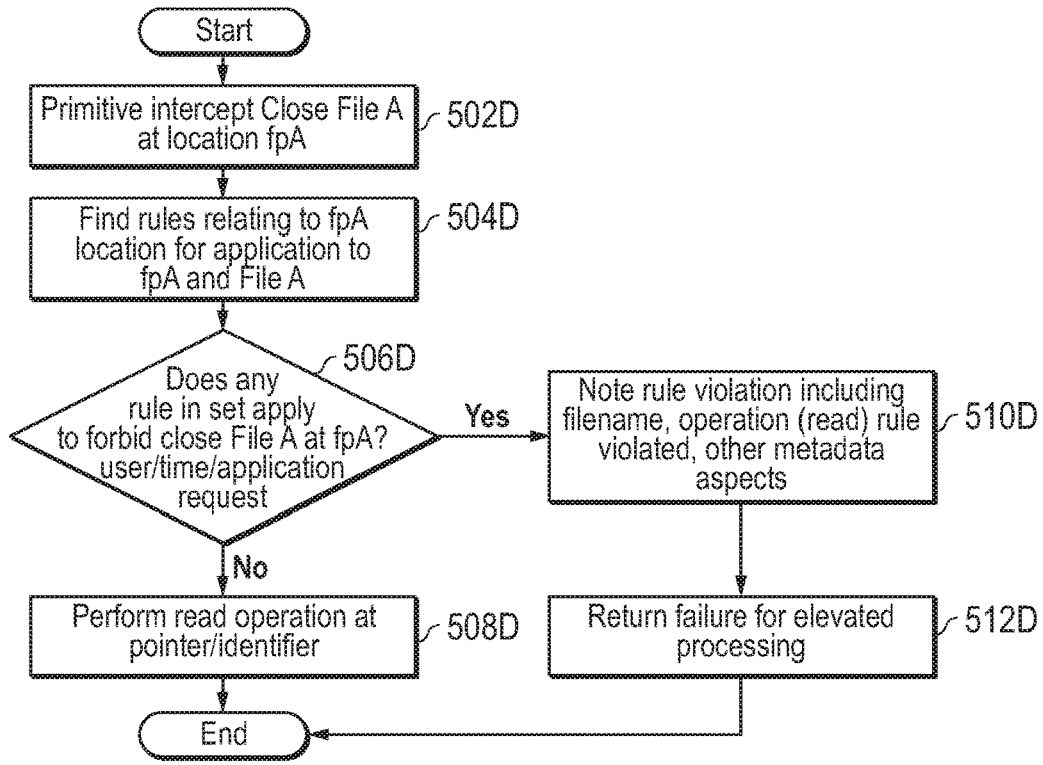
FIG. 5D is a flow diagram illustrating operation of a security filewall system for an information handling system according to yet another embodiment of the present disclosure.

FIG. 5D shows an example method embodiment of a security firewall system rule assessment for a "Close File A" operation attempted via the file system of an information handling system. Flow begins at 502D where a file filter operating a security firewall validator may intercept the primitive for a "Close File A" operation. The file filter system may operate a custom file filter driver relating to the security firewall validator described according to embodiments herein. Proceeding to 504D, the security firewall validator will search a firewall rules database for all rules relating to File A. Then using a vector set of rules relating to File A, compares or reviews the rules in relation to the defining aspects of the attempted "Close File A" operation on File A.

At 506D, the firewall validator will determine if any rule in the vector set of rules applicable to File A forbids a close action on File A. The forbidden close action may be based on security level of file A such as the designation of personal information or high security files or designation of files only for operation with certain software applications. In other embodiments, access to File A may be restricted as an administrative file for the information handling system. For example, File A may run as part of a runtime kernel and may relate to security, malware detection, or other protection measures or may be necessary to ongoing operation of the operating system. Associated arguments with the operation of "Close File A" may be considered including the requesting application, script or other code requesting the file system open operation. Additionally, the type of operation, destination location, destination file formats, changes to file formats may further be considered as part of the arguments defining the "Close File A" requested action as applicable. Associated metadata relating to the attempted file system open request for File A may also be considered such as the user requesting the file system open action or metadata information such as time of day of the requested operation to establish normalcy of the request by this user.

In some specific examples of FIG. 5D, File A may be restricted as to availability to execute a close action for only particular applications or code such as one executing File A in runtime, as to level of security required to access, or as to the user requesting. For example a firewall rule may include <Forbid-Closure, SeverityXn>, <Forbid-Closure-Between-Hours, SeverityXn> among other firewall "close" rules.

If no rule in the vector set of firewall rules applicable to File A applies to the operation "Close File A" or the associated aspects of the operation in the arguments or metadata surrounding the attempted operation, then flow may proceed to 508D. At 508D, the file system drivers may proceed to execute the "Close File A" operation as requested. In some embodiments, a successful close action in response to the attempted "Close File A" may be recorded and logged for assessment of baseline levels for this type of action in a Firewall Rule Generator. If the security firewall system validator determines that one or more rules does apply to the attempted "Close File A" operation however, then flow may proceed to 510D.

At 510A, the firewall validator will log the rule violation or rules violations with the security firewall manager including recording the filename affected (File A) and the rule violated as part of a violation event footprint and log the aspects of the attempted "Close File A" and other associated argument or metadata aspects of the requested operation that may be identifying as part of an image of the violation event. In some embodiments, some or all of the violation event identification footprint may be included as part of the image of the violation event and later be hashed along with the image.

Flow may further proceed to 512D where the firewall manager receives an indication of failure and may elect to send the violation event identification or hash to a firewall communicator for transmission to an administrator, user, anti-malware system centralized at a remote location, or other information handling systems. Further processing may include analysis by a user or administrator and determination about whether the operation "Close File A" as requested is acceptable or an indication of a malware issue. Similarly, details of an event failure and any further processing may be sent to a firewall rule generator to further establish a rule or its severity level setting by adding a statistical data point used to determine the veracity of the rule or to reduce its reliability as a necessary firewall rule. At this point, the process may end.

The blocks of the flow diagram of FIGS. 5A, 5B, 5C and 5D or steps and aspects of the operation of the embodiments herein and discussed above need not be performed in any given or specified order. FIGS. 5A, 5B, 5C and 5D represent four basic types of primitives that may be requested during operation of code and software with the operating system and the file system associated with the OS. It is understood that similar firewall rule assessments may be made with respect to several additional file system operations and the success or failure due to violations recorded as data to be used to improve statistical bases for firewall rules. It is contemplated that additional blocks, steps, or functions may be added, some blocks, steps or functions may not be performed, blocks, steps, or functions may occur contemporaneously, and blocks, steps or functions from one flow diagram may be performed within another flow diagram including blocks, steps or description from other figures or embodiments described herein. For example, prohibition of action or access may occur contemporaneously or in any order with respect to removing or isolating the identified source of the violation event, establishing a footprint identification and hash, or preparing the transmission of the violation event occurrence to other information handling systems.

Figure 6:
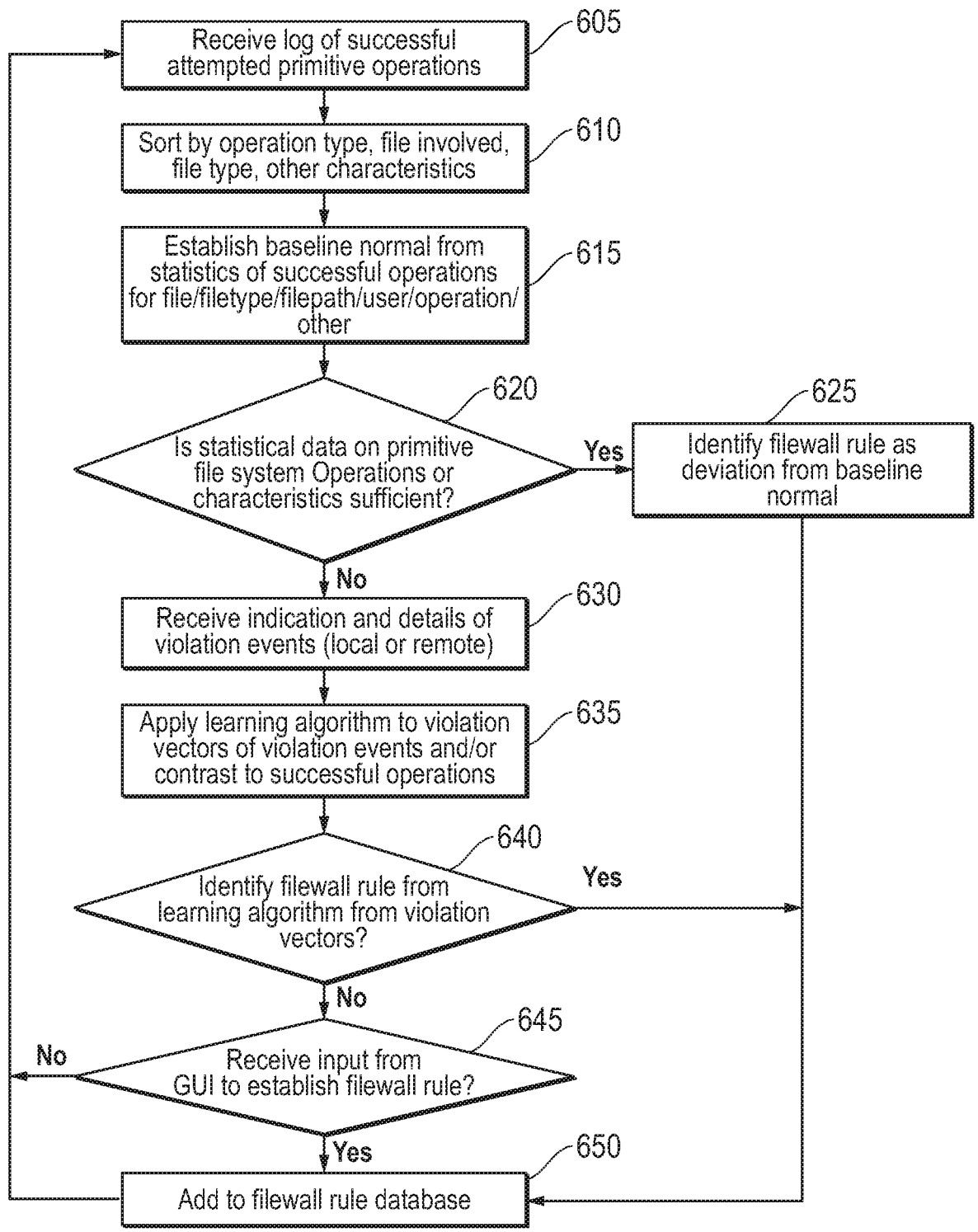
FIG. 6 is a flow diagram illustrating operation of a security filewall system with filewall rules generator for an information handling system according to yet another embodiment of the present disclosure.

FIG. 6 is a flow diagram illustrating a method of operating a security firewall system with the firewall rules generator for establishing firewall rules relating to attempted primitive operations according to an embodiment of the present disclosure. Some or all of the operation of the firewall rules generator may occur on the box of the information handling system or may occur at a remotely networked server location with memory or storage for a database. For example, the operation of an intelligent learning algorithm and ongoing logging of both successful primitive events and violation events may occur at a remote server and database to avoid burdening a client information handling system. In other aspects, some or all of the firewall generator may be administered and operated on the box of the protected information handling system. At block 605, an attempted primitive operation is submitted by an application, script, or other form of runtime executable code and is validated by the security firewall validator to be executed by the OS. The security firewall validator and the firewall manager will create a log of the successful primitive operation including data for a identifying footprint and other aspects regarding the files involved, file types, file paths, operations, calling application or code, user, and other aspects of the primitive file system operation that has passed validation as described herein. This successful log for an attempted primitive file system operation will be sent to a database for access by a firewall rules generator.

At 610, the firewall rules generator will sort logs collected in the database by operation type, files involved, file types involved, file paths, users, application code calling for an operation or file, to generate statistical data on operations permitted, files and access permitted, and numerous other characteristics of the various primitive file systems operations. In particular, firewall rules will be generated for primitive file system operations, as well as the circumstances around attempts to conduct those primitive operations. Accordingly, in some example embodiments, sorting of successful primitive operations will at least be sorted by primitive operation. In many embodiments, one or more additional characteristics of the attempts at primitive file system operations will also be used to index the logs of data. As described, several examples of attempted primitive operations may be tracked including a file system open, a file system close, a file system read, a file system write, a file system seek, a file system delete, a file system combine, and other operations. Several are discussed in embodiments herein.

Proceeding to 615, the firewall rules generator will establish a baseline normal level of primitive operations with respect to the successful logs. The baseline normal statistics may be collected and established for each type of primitive operation plus particular statistics such as called file types, users, specific files called, metadata characteristics or the like as described in various embodiments herein. Proceeding to 620, the firewall rules generator will determine whether the statistical set of successful logs is a sufficient set of data to determine a level of confidence deviation at a threshold level. This confidence level may be with respect to a number of successful or admin/user approved primitive operations for access to a group of file types such that those file types are likely permitted for access. If the statistical data or number of samples is sufficiently large to meet a threshold level, flow may proceed to 625. At 625, the firewall rules generator may determine a new rule such that deviation from an established baseline normal set of characteristics for a primitive operation is an abnormal attempted primitive operation. The abnormality may be with respect to one characteristic such as file type attempted to be accessed or created/written or may be a combination of characteristics of the primitive operation such as a combination of user or calling application code and file types accessed or type to be written or created. Flow then proceeds to 650, where the newly generated firewall rule is added to the firewall rule database for use by the firewall validator. The firewall validator may then generate violation logs when the new firewall rule is exceeded. A severity level for such an automatic generation of a firewall rule may be a default at a lower or moderate level but may be changed manually by a user or admin upon notification of the rule and the violation. Further, a table of severity levels assigned to new firewall rules may assign any level of severity depending on what part of the file system is being affected if the rule is broken. The table may attribute different default severity levels when a broken rule affects a sensitive area indicating potential malware activity such as a mismatch of a called data type and a written data file or data file path which may suggest an attempted and unauthorized encryption for example.

If the successful log is assessed and no statistical threshold has been reached for a primitive operation with a particular cross section of characteristics, the firewall rules generator may proceed to 630 where a log indicating a violation event including details is received. In some embodiments, the firewall rules generator may begin the process of generating new firewall rules upon receipt of a violation event occurrence. In other embodiments, the receipt of a violation event log may occur contemporaneously with receipt of logs for successful attempted primitive operations. In some embodiments, the violation log may be received from the firewall manager upon a firewall validator detecting a violation. In other embodiments, the firewall manager may receive a violation event detected by another information handling system with which a relationship has been established through an enterprise, a networked anti-malware system, an administrator, or other connection. The log of the violation event may thus be received remotely or locally.

The process will proceed to 635. At 635, the firewall rules generator will record all file-system events in the form of meta-data and place in a database for intelligent learning algorithms to be applied. Rules later can be adapted based on typical utilization of files in a given environment. With this setting, intelligent algorithms may later apply rules automatically to create more stringent conditions for particular files, file types, users, etc. When a rule <Apply-Auto-Alg, SeverityXm> exists for a given file, system leverages metadata to create list of rules that "fit" a usage model for the file or related files and also that cooperate with existing rules. Thus, an intelligent learning algorithm may determine violation vectors that relate to characteristics of attempted primitive operations by assessing violation events received. In other aspects, the intelligent learning algorithm may further contrast violation events with successful primitive file system operations to determine differences and characteristics that should not be violated. In some embodiments, statistically significant baseline normal primitive operation characteristics may be used (not shown), but may not always be necessary for the intelligent algorithm to assess ongoing primitive operations and multiple characteristics and detect or determine abnormalities in operation.

At 640, if the intelligent learning algorithm has determined that certain characteristics or combinations for a primitive file system operation type would be abnormal or detects trends in operations that may indicate one or more attack vectors being executed by potential malware, flow may proceed to identify a new firewall rule identifying a primitive operation, the one or more characteristics to be monitored, and the rule applied when a combination of primitive filewall rule and characteristics are detected. As before, a default severity level may be assigned either by a singular default level or via a table indicating particular types of new filewall rules which may correspond to different assigned severity levels. Upon creation of the new filewall rule by the intelligent learning algorithm, the flow may proceed to 650 to add the filewall rule to the filewall rules database.

If the learning algorithm does not determine there is one or combination of characteristics that associated with a primitive operation that warrant a new filewall rule, flow may proceed to 645. At 645, an input from a graphical user interface may be received where a user or an administrator may input a custom rule for implementation within the filewall rules. It is appreciated that the filewall rules generator may not need any input at 605 or 630 of an indication of a successful primitive operation or a violation event to receive the user or admin input of a customized filewall rule. If this custom filewall input is received, the GUI may provide parameters needed to create a filewall rule to the user or admin. For example, a drop-down menu of selectable domain aspects such as a particular file, file type, file path, user, or the like may be selected followed by selection of a type of primitive operation, and in some embodiments a range or resulting file type or operation result or the like. In this way, details for creating the necessary associations for a filewall rule may be easily input. Upon creation of a customized filewall rule by a user or an admin or the like, the flow may proceed to 650 to add the filewall rule to the filewall rules database. If no customized filewall input is received at 645 or after any new filewall rule is added to the filewall rules database, the filewall rules generator may return to 605 an continue to monitor for a log of successful attempted primitive operations, receipt of a violation event indication, or receipt of a customized filewall rule input from a user or admin and proceed as described above.

The blocks of the flow diagram of FIG. 6 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram such as the other figures in this disclosure or other described embodiments in this disclosure. For example, determination of a new filewall rule may be triggered contemporaneously or in any order with respect to receiving successful primitive file system operation data, violation event data, remote filewall data from other information handling systems or a central aggregator of data, or input from a user or administrator such as via a GUI or other interface. Each alone or in combination may trigger the filewall rules generator to establish a new filewall rule according to embodiments herein.

In some embodiments, dedicated hardware implementations such as application specific integrated circuits, programmable logic arrays and other hardware devices can be constructed to implement one or more of the methods described herein or portions of one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as an Intel® Core™ or ARM® RISC brand processors, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
    a processor executing code instructions under an operating system of the information handling system of a security filewall validation system for inspecting primitive file system operations to detect abnormal file types, abnormal file operation, or abnormal intended result files in violation of a security filewall rule set;
a memory for storing the security filewall rule set describing permitted access to file types, file-paths, mounting points, data volume access rules, or data operations relating to the primitive file system operations;
the security filewall validation system intercepting an attempted primitive file system operation;
the security filewall validation system comparing the attempted primitive file system operation or its associated arguments indicating file, file location, and intended result to the security filewall rule set;
the processor logging a detected filewall rule violation event when a filewall rule is violated by the attempted primitive file system operation or its associated arguments defining the primitive file system operation;
the processor executing code of a security filewall manager to queue the detected filewall rule violation event until a threshold level of the detected filewall rule violation events has been met; and
the processor to transmit a violation event identification footprint and a hash identifying the violation event to a second information handling system.

2. The information handling system of claim 1, wherein the security filewall validation system operates as part of a file filter driver.

3. The information handling system of claim 1, further comprising:
the processor executing code of a filewall violation handler to determine a severity classification of a detected filewall violation event from the security filewall rule set.

4. The information handling system of claim 1, further comprising:
the processor executing code of a filewall violation handler executing an action in response to the detected filewall rule violation event based on a determined severity classification for the filewall violation event.

5. The information handling system of claim 4, further comprising:
the filewall violation handler submitting a denial to a file system driver of an operating system to prohibit the attempted primitive file system operation.

6. The information handling system of claim 1, further comprising:
the processor executing code of a security filewall manager to elevate the detected filewall rule violation event for further processing by a user or administrator of the information handling system.

7. The information handling system of claim 1, further comprising:
the processor reducing the threshold level based on a determined severity classification of a detected filewall violation event and elevating the detected filewall rule violation event for further processing by a user or administrator of the information handling system at a lower threshold with an increased severity classification level.

8. The information handling system of claim 1 wherein the processor transmit a the violation event identification footprint and a hash identifying the violation event to a second information handling system that is on a relationship list for communication.

9. A computer implemented method comprising:
executing code instructions under an operating system of an information handling system, via a processor, of a security filewall validation system for inspecting primitive file system operations of an information handling system to detect abnormal file types, abnormal file operation, or abnormal intended result files in violation of a security filewall rule set;
storing, via memory, the security filewall rule set describing permitted access to file types, file-paths, mounting points, data volume access rules, or data operations relating to the primitive file system operations;
intercepting an attempted primitive file system operation;
comparing the attempted primitive file system operation including arguments indicating file, file location, and intended result to the security filewall rule set;
logging a detected filewall rule violation event when a filewall rule is violated by the attempted primitive file system operation or its associated arguments defining the primitive file system operation;
determining a severity classification of a detected filewall violation event from the security filewall rule set;
queueing the detected filewall rule violation event until a threshold level of the detected filewall rule violation events has been met where the threshold level depends on the severity classification; and
to transmitting a violation event identification footprint and a hash identifying the violation event to a second information handling system.

10. The method of claim 9, wherein the filewall rule includes a file type access rule limiting file type for an attempted write primitive file system operation.

11. The method of claim 9, wherein the filewall rule includes a file type access rule limiting data type to match a write file type for an attempted write primitive file system operation.

12. The method of claim 9, further comprising:
elevating the detected filewall rule violation event for further processing by a user or administrator of the information handling system with at least a moderate severity classification level.

13. The method of claim 9, further comprising:
submitting, via a filewall violation handler, a denial to a file system driver of an operating system to prohibit the attempted primitive file system operation.

14. The method of claim 9, further comprising:
logging a successful attempted primitive file system operations and its associated arguments defining the primitive file system operation for establishing a baseline normal for primitive file operations for a file, file path, or file type.

15. The method of claim 14, further comprising:
generating filewall rules, via a filewall rules generator, to limit primitive file system operations that deviate from the established baseline normal for the primitive file operations for a file, file path, or file type.

16. An information handling system comprising:
a processor executing code instructions under an operating system of the information handling system of a security filewall validation system for inspecting primitive file system operations to detect abnormal file types, abnormal file operation, or abnormal intended result files in violation of a security filewall rule set;
a memory for storing the security filewall rule set describing permitted access to file types, file-paths, mounting points, data volume access rules, or data operations relating to the primitive file system operations;

the security filewall validation system intercepting an attempted primitive file system operation;

the security filewall validation system comparing the attempted primitive file system operation or its associated arguments indicating file, file location, and intended result to the security filewall rule set;

the processor executing code of a security filewall manager to queue the detected filewall rule violation event until a threshold level of the detected filewall rule violation events has been met; and the processor to transmit a violation event identification footprint and a hash identifying the violation event to a second information handling system.

17. The information handling system of claim 16, wherein the filewall rule includes a destination file format metadata location after a data protection encryption for an attempted write primitive file system operation.

18. The information handling system of claim 16, wherein the filewall rule includes a file type access rule limiting accessing applications for an attempted open primitive file system operation.

19. The information handling system of claim 16, further comprising:

a filewall rules generator tracking non-violating attempted file system operations to establish a baseline of non-violating file system operations and associated arguments; and the filewall rules generator determining a filewall rule based on deviation from the non-violating filewall system operations for a file, file type, or file path.

20. The information handling system of claim 16, further comprising:

an intelligent learning algorithm contrasting non-violating attempted primitive file system operations with violation events.

* * * * *